Figure 1:
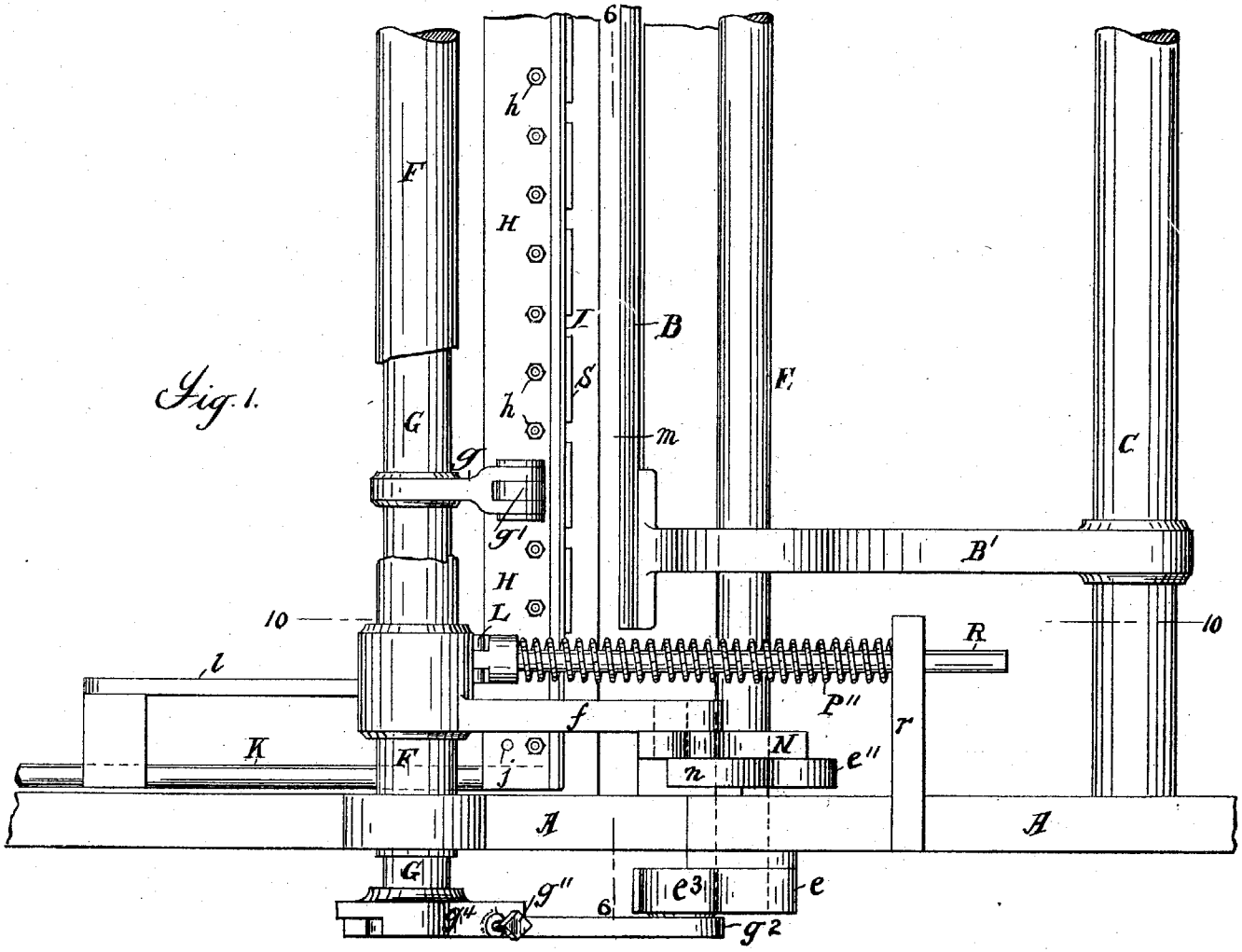

No. 12,456. REISSUED FEB. 20, 1906.

W. A. LA SOR & C. M. SMITH.

PAPER SLITTING DEVICE FOR FOLDING MACHINES.

APPLICATION FILED JUNE 10, 1905.

5 SHEETS—SHEET 1.

Witnesses
Geo. H. Botts
A. White

Inventors
William A. La Sor
Charles M. Smith
By their Attorneys
Philipp, Sawyer, Rice & Kennedy No. 12,456. REISSUED FEB. 20, 1906.
W. A. LA SOR & C. M. SMITH.
PAPER SLITTING DEVICE FOR FOLDING MACHINES.
APPLICATION FILED JUNE 10, 1905.
5 SHEETS—SHEET 2.
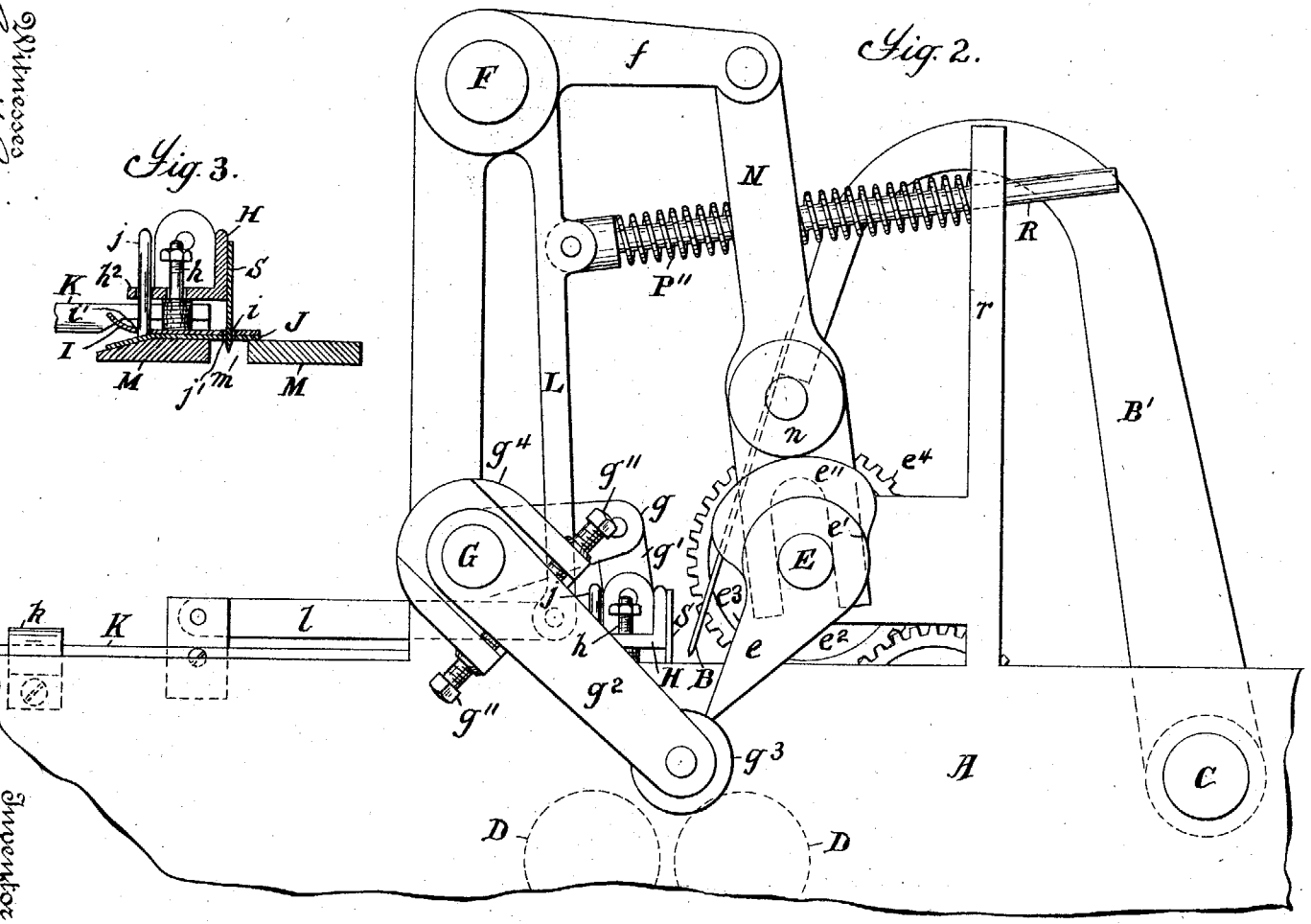
Witnesses
Geo. H. Bott
A. White
Inventors
William A. La Sor
Charles M. Smith
By Their Attorneys
Philip P. Brown
Pierce H. Connolly No. 12,456. REISSUED FEB. 20, 1906.
W. A. LA SOR & C. M. SMITH.
PAPER SLITTING DEVICE FOR FOLDING MACHINES.
APPLICATION FILED JUNE 10, 1905.
5 SHEETS—SHEET 3.
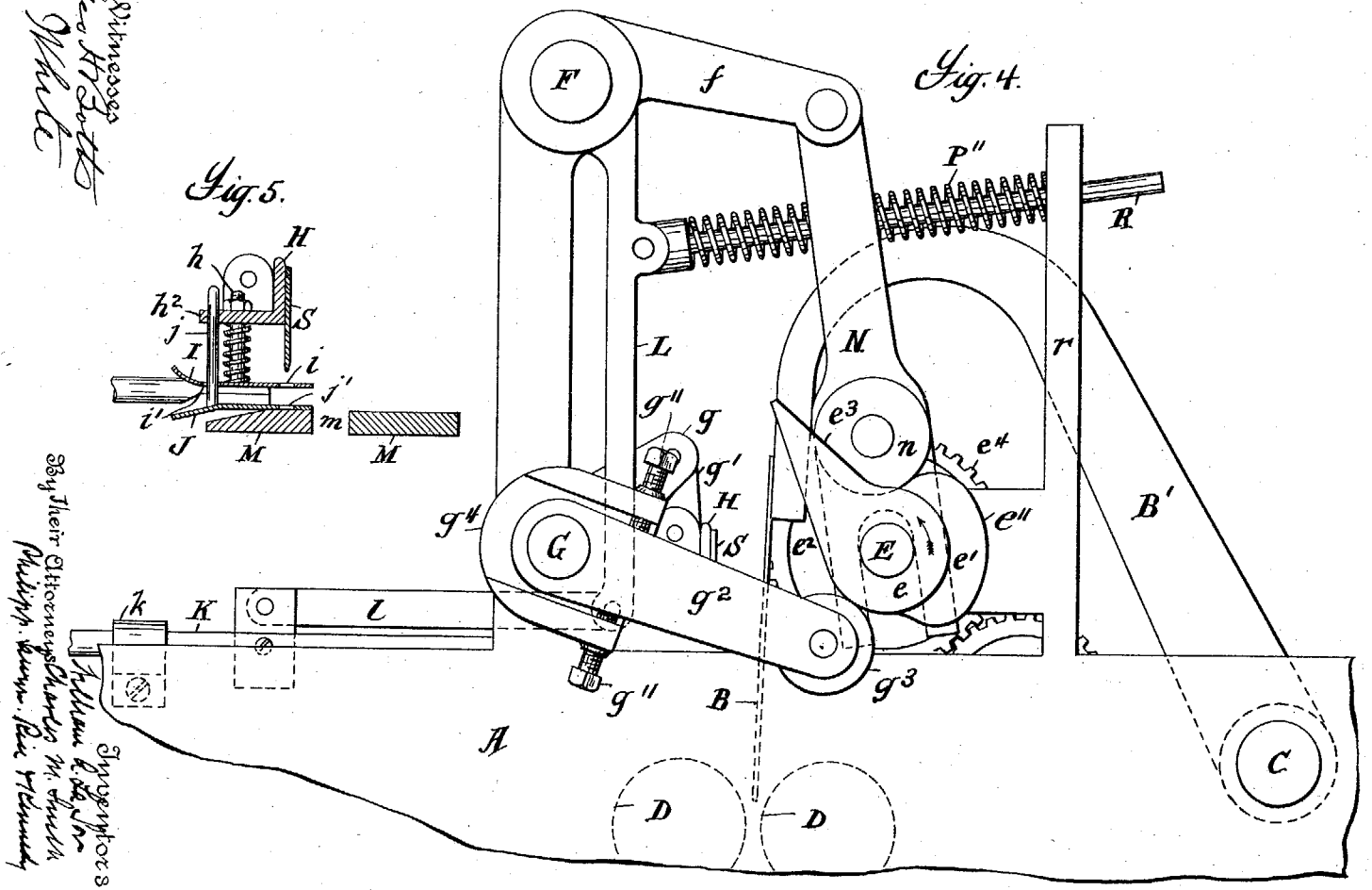
Witnesses
Geo. H. Lotts
A. White
Inventors
William A. La Sor
Charles M. Smith
By their Attorneys
Philipp, Quarm, Rice & Kennedy No. 12,456. REISSUED FEB. 20, 1906.

W. A. LA SOR & C. M. SMITH.

PAPER SLITTING DEVICE FOR FOLDING MACHINES.

APPLICATION FILED JUNE 10, 1905.

5 SHEETS—SHEET 4.

Witnesses
Geo H. Botts
A. White

Inventors
William A. La Sor
Charles M. Smith
By their Attorneys
Philipp Thum
Rice & Kennedy No. 12,456. REISSUED FEB. 20, 1906.

W. A. LA SOR & C. M. SMITH.

PAPER SLITTING DEVICE FOR FOLDING MACHINES.

APPLICATION FILED JUNE 10, 1905.

5 SHEETS—SHEET 5.

Witnesses
Geo. H. Botts
A. White

Inventors
William A. La Sor
Charles M. Smith
By their Attorneys
Philipp, Quigg, Rice & Kenyon

UNITED STATES PATENT OFFICE.

WILLIAM ALLAN LA SOR, OF RAHWAY, NEW JERSEY, AND CHARLES M. SMITH, OF NEW YORK, N. Y.

PAPER-SLITTING DEVICE FOR FOLDING-MACHINES.

No. 12,456. Specification of Reissued Letters Patent. Reissued Feb. 20, 1906.

Original No. 751,185, dated February 2, 1904. Application for reissue filed June 10, 1905. Serial No. 264,740.

*To all whom it may concern:*

Be it known that we, WILLIAM ALLAN LA SOR, residing at Rahway, Union county, State of New Jersey, and CHARLES M. SMITH, residing in the city of New York, borough of Brooklyn, county of Kings, and State of New York, citizens of the United States, have invented certain new and useful Improvements in Paper-Slitting Devices for Folding-Machines, of which the following is a specification sufficient to enable others skilled in the art to which the invention appertains to make and use the same.

Our invention relates to means for perforating one or more sheets of paper on the line upon which it is to be folded. Heretofore this has been accomplished by means of a rotary cutter upon one folding-roller, the edge of said cutter fitting in a corresponding groove in the opposite folding-roller, so that the line of perforations was formed at right angles to and during the operation of making one fold for the purpose of defining the line upon which the paper was to be subsequently folded. Hence the line of the first fold could not be perforated, and the paper was apt to buckle or crease along the edge of the first fold. Furthermore, the cutting-teeth had a tendency to pull or draw up the fiber of the paper, especially if the latter was fed to the rollers with the grain of the paper at right angles to the cutters, or, in other words, parallel to the folding-rollers, resulting in roughness and irregularity of edge and tendency also to disturb the perfect alinement of feed, since the cutting was effected while the paper was in motion and supported only by the traveling tapes, so that the shifting of the paper laterally under the action of the rotary cutter was of frequent occurrence. We overcome these and other practical objections to the old method of perforating the paper by our invention.

In the accompanying drawings we show operative means for carrying out our invention in conjunction with folding mechanism of old and well-known form; but we do not confine ourselves to the identical form and construction of parts shown, since other mechanical expedients may be resorted to in adapting the invention to other forms of folding apparatus, whereby like results may be obtained.

Figure 6:
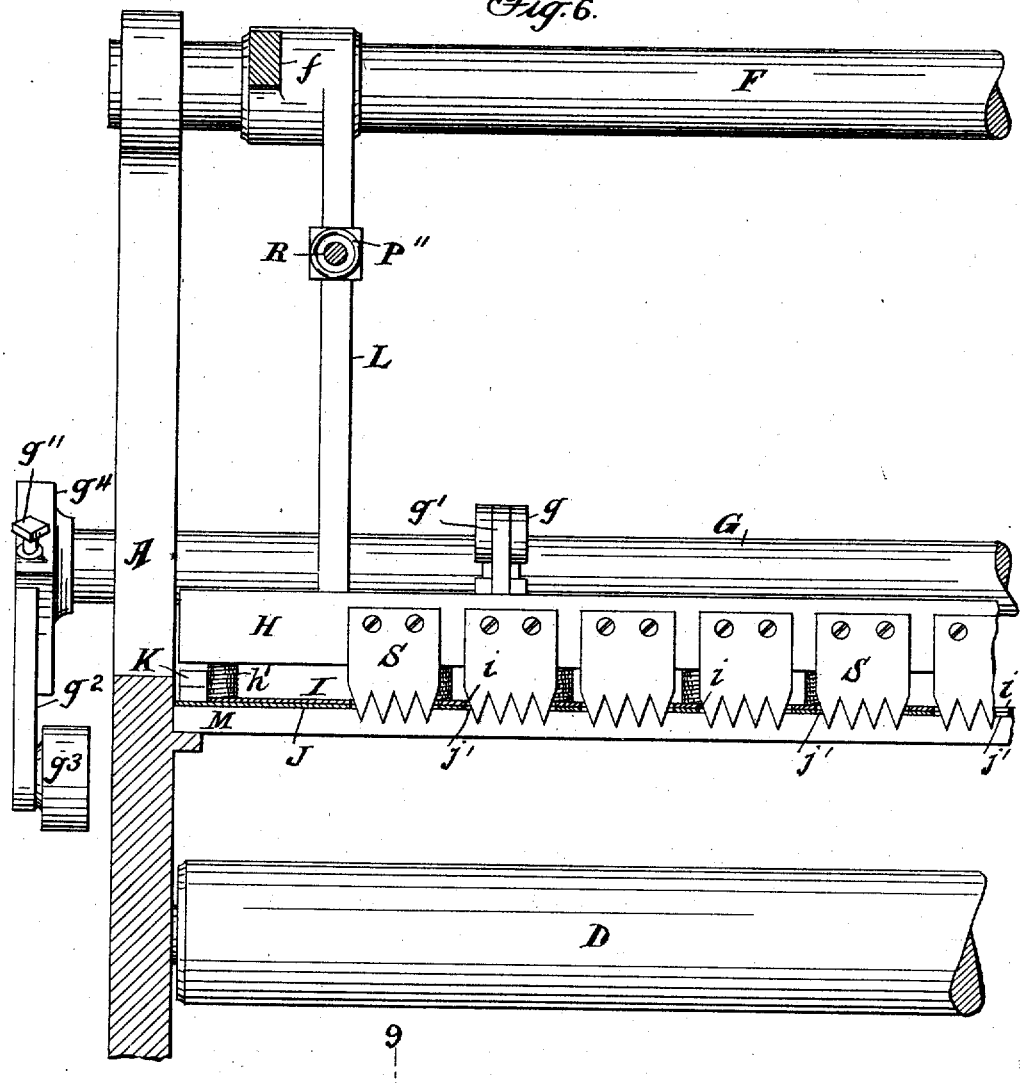
Figure 7:
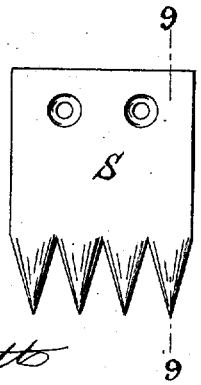
Figure 8:
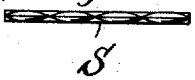
Figure 9:
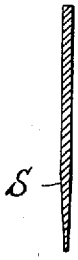
Figure 10:
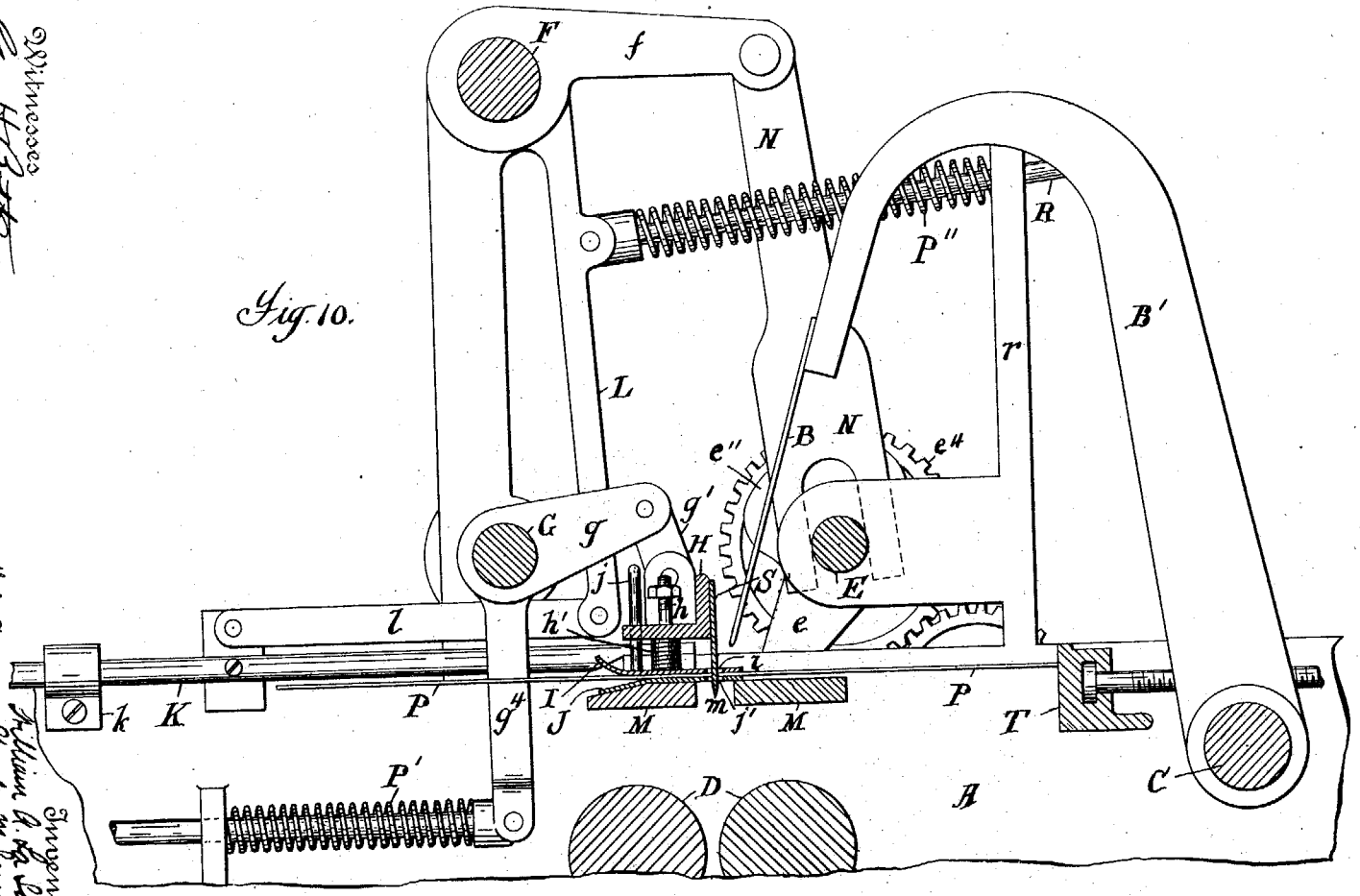

Figure 1 is a plan of one extremity of our paper-slitting device shown in conjunction with adjoining parts of the folding-machine. Fig. 2 is an end elevation of the parts while slitting the paper; Fig. 3, a sectional view illustrating in detail the relative positions of the parts of the paper-perforating device when the folding and actuating mechanism is in the position shown in Fig. 2. Fig. 4 is a view similar to Fig. 2, showing the position of parts during the operation of folding the paper. Fig. 5 is a view like unto Fig. 3, illustrating the relative positions of the parts of the paper-slitting device when the folding and actuating mechanism is in the position shown in Fig. 4. Fig. 6 is a vertical section, partly in elevation, upon plane of line 6 6, Fig. 1, with the parts in the position indicated in Fig. 2. Fig. 7 is a front elevation of one of the slitting-plates; Fig. 8, an edge view of the same; and Fig. 9 a section thereof upon plane of line 9 9, Fig. 7. Fig. 10 is a vertical longitudinal section taken upon plane of line 10 10, Fig. 1, looking toward the opposite side of the machine and indicating the position of the paper just prior to the slitting operation.

In the drawings, A represents the stationary framework of a folding-machine of well-known construction.

B is the folding-blade, attached to bent arms B′ B′, rigidly secured to the rock-shaft C, mounted in suitable bearings in the side frame A of the machine.

D D are the folding-rollers, to which the paper P is delivered by the folding-blade B in the usual manner, these parts being actuated and timed, as heretofore, by gearing. (Omitted from the drawings as superfluous and for the sake of rendering the new parts more conspicuous.)

E is a cam-shaft mounted in suitable bearings on the side members of the frame A and rotated continuously by means of a gear $e^4$, rigidly secured to it and borrowing motion from the train of gearing by which the older parts of the machine are actuated.

F and G are rock-shafts mounted upon and between standards integral with the side members of the frame A or other stationary parts of the apparatus.

The apparatus includes a movable carrier for the slitter to be hereinafter described.

While this carrier may be variously constructed and moved, in the particular construction shown it consists of a cross-bar H. As shown, there are rigidly secured to the rock-shaft G arms $g$, which are pivotally connected by links $g'$ with the cross-bar H, preferably, though not necessarily, made of angle-iron. To this cross-bar H are secured the slitting-teeth S. Suspended upon the cross-head H by means of rods $h$ is a presser-foot plate I, between which and the cross-head H are interposed springs $h'$, which tend constantly to force the presser-foot plate I downward away from the cross-head. The presser-foot plate I is formed with a series of slots $i\ i$, coinciding with the slitting-teeth S, so that the latter may pass freely through the plate I.

Held in alinement with, but not attached directly to, the cross-head H and presser-foot plate I is a paper-support which may be varied in its construction, but which, as shown, consists of a rest-plate J, provided with upright studs $j$, which pass through guide-holes $h^2$ and $i'$ in the cross-head H and presser-foot plate I, respectively. The rest-plate J is also formed with a series of slots $j'$, coinciding with the slots $i$ in the presser-foot plate I and for a like purpose. The rest-plate J is secured to slide-rods K K, supported in guide-ways $k\ k$ on the side members of the frame A or other stationary parts of the machine. These slide-rods K K are pivotally connected, by means of links $l\ l$, with rock-levers L L, secured rigidly to the rock-shaft F.

M is the folder bed or table, formed with the folding-slot $m$, through which the folding-blade B carries the paper to the folding-rollers D D.

At each end of the rock-shaft G is secured a rocker-arm $g^2$, preferably provided with an antifriction-roller $g^3$ for engagement with what may be designated as the "slitter-cams" $e\ e$, secured to the opposite ends of the cam-shaft E, the eccentric portions $e'\ e'$ of which indirectly cause the depression of the slitter-teeth S, as hereinafter set forth. The engagement of the rollers $g^3\ g^3$ with the cams $e\ e$ is insured by means of the pressure of springs P′ P′, acting against arms $g^4$, rigidly attached to the rock-shaft G, as indicated in Fig. 10.

The rock-shaft F is rocked through the medium of cams $e''\ e''$, secured to the cam-shaft E near each extremity thereof, said cams $e''\ e''$ acting upon antifriction-rollers $n\ n$, mounted upon cam-links N N, the upper ends of which are pivotally connected to the rock-lever arms $f\ f$, while their lower bifurcated ends straddle the cam-shaft E, as will be seen by reference to Figs. 2 and 4. In order to insure the engagement of the rollers $n\ n$ with the cams $e''\ e''$, springs P″ P″ are so arranged as to tend constantly to rock the lever-arms $f\ f$ downward. This may be accomplished by means of rods R R, pivotally connected to the levers L L at one end and passing through stationary abutments $r\ r$ at the other, carrying the springs P″ P″, interposed between said levers L L and said abutments $r\ r$. It is obvious that the engagement of the rollers $g^3$ and $n$ with their respective cams $e\ e''$ may be accomplished in various ways, and we do not restrict ourselves to the identical means shown. In fact, even the means employed for effecting the thrust and retraction of the slitting-teeth and for effecting the advance and withdrawal of the cross-head upon which said slitting-teeth are mounted may be widely varied.

It is obvious that various forms and arrangements of slitting-teeth may be used with substantially like results, although we prefer the form of V-shaped teeth shown herein, especially when the latter are made elliptical in cross-section, as illustrated in Fig. 7 and 8, in which form it is least calculated to disturb or break the fiber of the paper. In this connection it must be noted that the adjustment of the stroke of the slitting-teeth is of importance in regulating the length of slit, and consequently the width of the uncut paper between the slits. This adjustment may unquestionably be effected by means of mechanical expedients other than those shown herein by way of practical illustration, in which the rock-lever arms $g^2$ are held rigidly on the shaft G by means of set-screws $g''\ g''$, mounted upon heads $g^4\ g^4$, rigidly secured to the shaft G, the arms $g^2\ g^2$ themselves not being directly secured to the shaft G. Thus by adjusting the position of the arms $g^2\ g^2$ by means of the set-screws $g''\ g''$ with relation to the rocker-arms $g\ g$ upon the shaft G it is apparent that the downward thrust of the slitting-teeth may be set to effect any desired degree of penetration of the paper.

The parts are so timed with relation to each other that as the sheet or layer of paper P enters the machine and passes between the rest-plate J and presser-foot plate I to stop with its inner or forward edge against the gage T the slitter-cams $e\ e$ depress the arms $g^2\ g^2$, thereby rocking the shaft G and depressing the arm $g$. As a result the links $g'\ g'$ depress the cross-head H. As the cross-head descends the presser-foot plate I encounters and rests upon the top of the paper P, the continued descent of the cross-head compressing the springs $h'$ and causing them to exert their pressure against the said presser-foot plate, so that the latter holds the paper P firmly down upon the rest-plate J, as indicated in Fig. 10, thus sustaining the paper against the action of the slitting-teeth S. It is to be noted in this connection that the plates I and J extend out beyond or in front of the teeth S, said plates being formed with the slots $i$ and $j'$ to allow the points of the teeth to pass downward, so that the paper is supported and held taut on all sides. As a consequence the slitting-knives make clean cuts and cannot bend or distort the paper on the line of fold.

During the latter part of the above operation the cross-head H has of course reached its forward position, as shown in Fig. 10, and (by reason of the action of the cam $e''$, hereinafter set forth,) with the slots $i$ and $j'$ in the plates I and J, together with the slitting-teeth S in line vertically with the folding-slot $m$ in the folder bed or table M.

We have thus far described the action of the inclined surface $e^2$ of the cams $e$ upon the rollers $g^3$. As the apex of the cam is passed and the inclined surface $e^3$ comes in contact with the roller $g^3$, being held thereto by the spring P′, acting through the rocker-lever G and arms $g^2$, the cross-head H rises, withdrawing the slitting-teeth S from the paper P; but the springs $h'$ hold the presser-foot plate I down against the paper until the slitting-teeth S have cleared the latter, thus stripping the paper from said teeth. The continued elevation of the cross-head H under the action of the spring P′ and cam $e$ finally raises the presser-foot plate I from the paper P, relieving it from pressure.

During the raising of the cross-head, as above set forth, the cams $e''$, acting through the medium of the rollers $n$, links N, arms $f$, rock-shaft F, levers L, links $l$ $l$, and slide-rods K, have withdrawn the cross-head H and plates I and J from the folding-slot $m$ in the folder-table M, as shown in Figs. 4 and 5, when the folding-blade B descends upon the paper along the line of fold prescribed by the slits just formed and carries the paper down to the folding-rollers D D, as heretofore, when the whole operation is repeated upon the next feed of paper introduced.

It is to be understood that the cams, levers, &c., shown in Figs. 1, 2, 4, 6, and 10 of the drawings are duplicated upon the opposite side of the machine.

Our invention is differentiated from the prior state of the art aside from the special combination and arrangement of parts described in giving effect to the same by the following new and important features—namely, the paper is slitted in a line parallel to the folding-blade and just prior to its descent of the latter, and this prescribed line of fold is slitted while the paper is at rest and held firmly in register. Furthermore, the paper is automatically stripped from the slitting-teeth, which latter may be adjusted to make slits of various lengths, as desired. All this we accomplish by providing for the advance of the slitting mechanism to the line of fold and its retreat therefrom prior to the descent of the folding-blade.

The advantages of slitting the prescribed line of fold in the paper while the latter is held firmly in register just prior to the descent of the folding-blade are obvious, since the paper is not moved from register until carried down to the folding-rollers by the folding-blade.

What is claimed is—

1. In a paper-folding apparatus, the combination with the folding means, of slitting devices, means for operating said devices to effect the slitting, and means for moving said devices toward and away from the folding means.

2. In a paper-folding apparatus, the combination with the folding means, of slitting devices including a slitting-blade and paper-support, means for operating said devices to effect the slitting, and means for moving the blade and support toward and away from the folding means.

3. In a paper-folding apparatus, the combination with the folding means, of slitting devices, means for operating said devices to effect the slitting, and means for giving said devices a movement toward and away from the folding means, said movement being parallel to the plane of the paper.

4. In a paper-folding apparatus, the combination with the folding means, of slitting devices including a slitting-blade and paper-support, means for operating said devices to effect the slitting, and means for moving the blade and support toward and away from the folding means, said movement being parallel to the plane of the paper.

5. In a paper-folding apparatus, the combination with a cross-head, of a slitting-blade carried thereby, a paper-support, means for moving the cross-head and support into and out of slitting position, and means for effecting a slitting movement of the blade.

6. In a paper-folding apparatus, the combination with a cross-head, of a presser-foot carried thereby, a slitting-blade mounted thereon, a paper-support, and means for moving the cross-head and support toward and away from the slitting position, and means for effecting a movement of the blade.

7. In paper-folding apparatus, the combination with the folding-blade and rollers of a series of V-shaped slitting-teeth which are elliptical in cross-section, said teeth being arranged parallel to said folding mechanism, and means for actuating the same whereby the paper is partially severed without injury to its fiber along the line of fold, substantially as set forth.

8. In paper-folding apparatus, the combination with the folding-blade and folding-rollers of a series of slitting-teeth which are elliptical in cross-section, said elliptical teeth being arranged parallel to said folding mechanism, and means for actuating the same whereby the paper is partially severed without injury to its fiber along the line of fold for the purpose set forth.

9. In paper-folding apparatus, the combination with the folding blade and rollers, of a series of V-shaped slitting-teeth elliptical in cross-section, arranged substantially parallel to said folding mechanism, means for actuating said V-shaped slitting-teeth, means for supporting the paper against the action of said V-shaped slitting-teeth, and means for adjusting the said V-shaped slitting-teeth with relation to said support for the paper, whereby the length of the slits formed by said V-shaped slitting-teeth may be varied, substantially as described.

10. In paper-folding apparatus, the combination with the folding blade and rollers, of slitting-teeth S, cross-head H, links $g'$, arms $g$, rock-lever G, flanged heads $g^4$, secured thereto, the set-nuts $g''$ $g''$, on said heads $g^4$, and the levers $g^2$, and bearing-rollers $g^3$, together with the cams $e$, upon the shaft E, the whole arranged and operating substantially as and for the purpose set forth.

11. In paper-folding apparatus, the combination with the folding blade and rollers, of the cross-head H, the slitting-teeth S, the presser-plate I, springs $h'$, rest-plate J, and means for moving the cross-head and rest-plate into and out of operative position, substantially as described.

12. In a paper-folding apparatus, the combination with the folding blade and rolls, of the cross-head H, the slitting-teeth S, the presser-plate I formed with the slots $i$, springs $h'$, the rest-plate J formed with slots $j''$, and means for moving the cross-head and rest-plate into and out of operative position, substantially as set forth.

13. In paper-folding apparatus, the combination with the folding blade and rollers, of the cam-shaft E, and cams $e$, $e'$, rock-shaft G, and arms $g$, $g^2$, links $g'$, cross-head H, and slitting-teeth S, the links N and L, rock-shaft F, and arms $f$, links $l$, slide-rods K, cross-head H, slitting-teeth S, presser-plate I, rest-plate J, the whole aranged and operating substantially in the manner and for the purpose described.

In testimony whereof we have hereunto set our hands in the presence of two subscribing witnesses.

WILLIAM ALLAN LA SOR.
CHARLES M. SMITH.

Witnesses:
A. WHITE,
JAMES O. RICE.